United States Patent [19]

Yamashita

[11] 4,048,892
[45] Sept. 20, 1977

[54] BELT SAW GUIDING DEVICE FOR A BELT SAW MACHINE

[76] Inventor: Daizo Yamashita, 3-23-11, Kaijin, Funabashi, Chiba, Japan

[21] Appl. No.: 679,213

[22] Filed: Apr. 22, 1976

[51] Int. Cl.² .................... B23D 55/06; B27B 13/10
[52] U.S. Cl. ................................. 83/799; 83/820
[58] Field of Search .............. 83/817, 820, 794, 788, 83/795, 796, 797, 798, 799, 800, 801

[56] References Cited

U.S. PATENT DOCUMENTS 1,264,339  4/1918  Shinn ............................... 83/799

Primary Examiner—Willie G. Abercrombie
Attorney, Agent, or Firm—George B. Oujevolk

[57] ABSTRACT

A belt saw guiding device for a belt saw machine comprises a pair of guide pulleys, a pair of pulleys and a pair of guide rollers. The guide pulleys rotate on the respective axles extending vertically at the lower front right and left sides of a movable frame below which a work piece is to be placed. The pulleys are positioned at the upper rear right and left sides of the frame, respectively and rotate on the axles extending horizontally. Each of the guide rollers is inclined at an angle and arranged between the corresponding pulley and guide pulley. On the inclined guide rollers a belt saw is twisted so as to have its course changed while it runs, driven by the pulleys and the guide pulleys.

1 Claim, 3 Drawing Figures

BELT SAW GUIDING DEVICE FOR A BELT SAW MACHINE

BACKGROUND OF THE INVENTION

The invention relates to a belt saw guiding device for a belt saw machine, in particular to a guiding device which changes the running course of the belt saw in case a work piece of hard material is cut continuously in one direction by the belt saw.

A conventional belt saw machine comprises an arm fixed at one end to the machine bed and a pair of pulleys rotatably attached to the arm. Since the belt saw is driven by the pulleys, it halves run parallel in the opposite directions, facing each other. It is therefore impossible with such a machine to cut a work piece into smaller pieces each having a length more than the diameter of the pulleys. If the work piece is laid so as to obtain a longer piece, it will be cut into three pieces at a time by the saw halves. To obtain a longer piece with such a machine, the work table is inclined and the saw is forcedly guided in the direction perpendicular to the table. Even if this cumbersome method is employed, the resultant piece remains several times as short as the overall length of the belt saw machine. This means that if the work piece is to be cut into a little longer pieces, the machine has to be made proportionally huge.

If the machine is made massive for such a reason, it occupies much space in the factory and its cost becomes inevitably high. At any rate its size is practically limited for mechanical and economical reason.

SUMMARY OF THE INVENTION

Accordingly it is an object of the present invention to provide a belt saw guiding device which eliminates the drawbacks inherent to the prior art belt saw machine. The object is achieved by changing the course of the running belt saw at a postion where the saw does not cut the work piece. Namely, since the running course of the saw is changed, the size of the machine is made smaller and yet the machine can cut such a long and thick work piece as could not be cut by the conventional belt saw machine.

DETAILED DESCRIPTION OF THE PREFERRED EMBODIMENT

Figure 1:
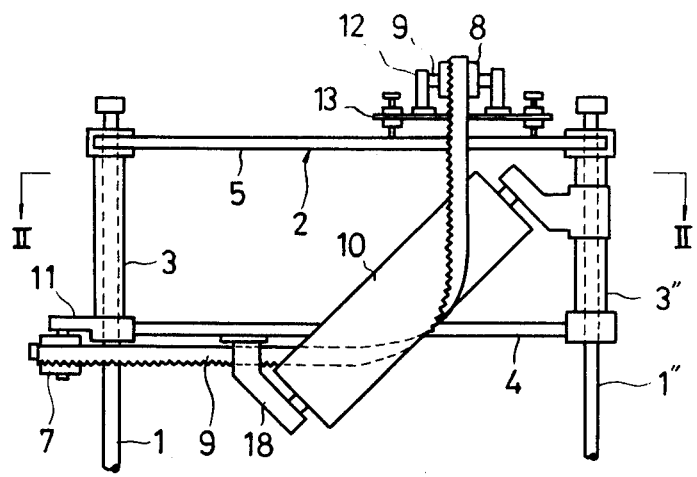
FIG. 1 is a side view of the belt saw guiding device according to the present invention.
Figure 2:
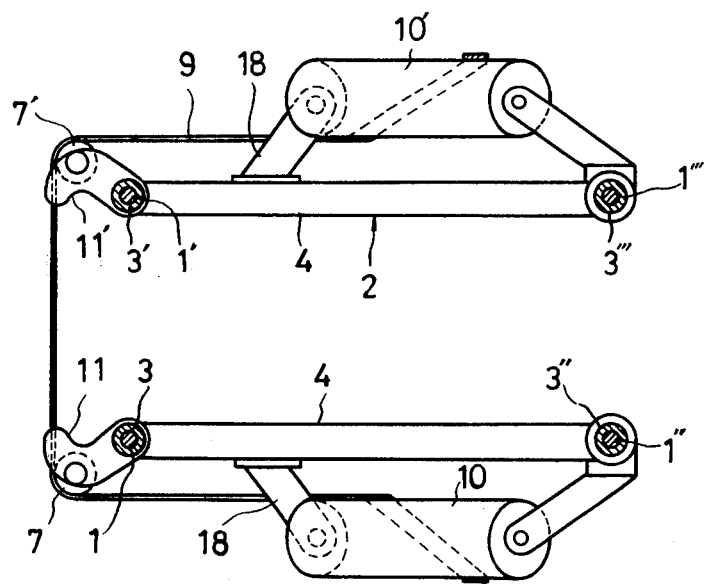
FIG. 2 is a sectional view of the device, taken along II—II in FIG. 1.
Figure 3:
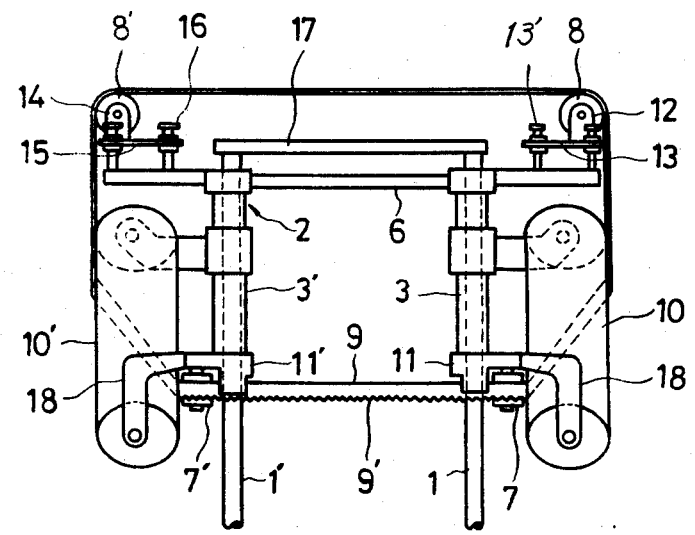
FIG. 3 is a front view of the device as illustrated in FIG. 1.

On the machine bed (not shown) four pillars 1, 1', 1" and 1''' stand upright. On these pillars a channel-shaped frame 2 is slidably mounted, and can move up and down. The frame 2 is constituted by four sleeves 3, 3', 3" and 3''' slidably mounted on the pillars 1, 1', 1" and 1''', respectively, two lower bars 4 connecting the sleeves 3 and 3" and the sleeves 3' and 3''', respectively, two upper bars 5 connecting the sleeves 3 and 3" and the sleeves 3' and 3''', respectively, and other bars 6 connecting the sleeves 3 and 3' and the sleeves 3" and 3''', respectively, only at their upper ends. Thus, the frame 2 is shaped like a channel as viewed from the front and straddles a work piece to be cut.

To the lower ends of the front right sleeves 3 and the front left sleeve 3' guide pulleys 7 and 7' are rotatably attached, respectively. On the other hand, pulleys 8 and 8' are attached to the upper ends of the rear sleeves 3" and 2''', respectively. They pulley 8 is rotated by an electric motor (not shown) and drives in turn the belt saw 9. The other pulley 8' pulls the belt saw 9 so as to regulated the tension on the belt saw 9. All the pulleys 7, 7', 8 and 8' serve to guide the belt saw 9. Between the guide pulley 7 and the pully 8 both disposed on the right side of the frame 2, a guide roller 10 is disposed and inclined. Similarly, another guide roller 10' is arranged and inclined between the guide pulley 7' and the pulley 8' both disposed at the left side of the frame 2. On these inclined guide rollers 10 and 10' the belt saw 9 is twisted and thus has its running course changed. The angle at which to incline the guide rollers 10 and 10' is determined in accordance with the angle which is defined by the axes of the pulleys 7 and 8 or 7' and 8'. If the axes of the pulleys 7 and 8 or 7' and 8' cross each other at right angle, the guide rollers 10 and 10' are inclined at 45° to the axis of the pulleys 7, 7', and 8', so that the belt saw 9 is twisted by 90° on them.

The guide pulleys 7 and 7' are supported by bearings 11 and 11', respectively. The bearings 11 and 11' act also as belt saw guides to ensure a smooth running of the saw 9 on the pulleys 7 and 7'. The pulleys 8 and 8' are supported likewise by bearings 12 and 14. These bearings 12 and 14 are mounted respectively on plates 13 and 15, which are fixed to the respective upper bars 5 by fixing members 13' and 16.

The top ends of the front pillars 1 and 1' are linked by a bar 17, and those of the rear pillars 1" and 1''' by another bar 17.

Since bearings 18 which support the lower ends of the guide rollers 10 and 10' is substantially L-shaped while the guide pulleys 7 and 7' are swung outwards a little from the frame 2, the belt saw, which is an endless belt, can be easily taken off.

A work piece is cut by the belt saw guided by the device of such a construction as mentioned above, in the following manner. First, the frame 2 is lifted up by a lifting device (not shown). Then a work piece is positioned between the right-side pillars 1 and 1' and the left-side pillars 1" and 1'''. After this the frame 2 is so lowered as to bring the saw teeth 9' into alignment with the cutting line of the work piece. This done, the electric motor is switched on to rotate the pulley 8. The frame 2 is then further lowered little by little either under its own weight or by the lifting device, thereby cutting the work piece into smaller pieces of a desired length. The thickness of a work piece which can be cut by machine corresponds to the distance between the machine bed and the bars 6. The frame 2 may be fixed instead, and the work piece is moved up and cut.

As mentioned above, the belt saw guiding device according to this invention comprises a pair of guide pulleys rotatable on vertical axles and disposed at the right and left sides of a movable frame which can straddle a work piece, a pair of pulleys rotatable on horizontal axles and disposed at upper rear right and left sides of the frame, and a pair of inclined guide rollers each disposed between the corresponding pulley and guide pulley. Since a belt saw, if guided by the guiding device, is twisted at an angle and can thus have its course changed, only that portion of the saw which serves to cut the work piece is allowed to touch the work piece. Accordingly, as the cutting operation proceeds, no portion of the work piece other than the cutting portion is mistakenly cut no matter how long the piece is. To cut a piece which is too thick to be placed in the channel-shaped frame, the frame may be made broader and/or higher. Such size-modification is easily effected, and at a remarkably low cost.

What is claimed is:

1. A band saw comprising in combination:
   a. four upright pillars supporting a channel-shaped frame (2) having two pairs of sleeves slidably mounted thereon and moveable up and down with two pairs of parallel upper (5, 6) and lower bars (4) connecting each pair of sleeves, said frame defining lower and upper frame sections and front and rear ends;
   b. a first set of guide pulleys (7, 7') rotatably mounted toward said front end of said lower frame section with a vertical axle so that said pulleys rotate in the horizontal plane;
   c. a second set of guide pulleys (8, 8') mounted towards said rear end of said upper section with a horizontal axle so that said pulleys rotate in the vertical plane;
   d. a pair of inclined parallel guide rollers (10, 10') held between said lower frame section and said pillars towards said rear end, an endless belt saw (9) extending between said first and second set of guide pulleys and turned 90° by said guide rollers; and,
   e. drive means coupled to one of said pulleys to rotate said pulley and drive said band saw.

* * * * *